Patented May 28, 1946

2,401,133

UNITED STATES PATENT OFFICE 2,401,133

CHLORINATED RUBBER PRODUCT AND METHOD OF PRODUCING

Frederic James Bouchard, Blacksburg, Va., assignor to Hercules Powder Company, Wilmington, Del., a corporation of Delaware No Drawing. Application September 17, 1941, Serial No. 411,154

5 Claims. (Cl. 260—772)

This invention relates to a method of producing a chlorinated rubber of improved characteristics and to the improved product resulting; more particularly it relates to a method of producing chlorinated rubber having high initial and permanent flexibility in the form of an unplasticized film and to the improved chlorinated rubber so characterized obtained thereby.

Chlorinated rubber obtained by treatment of natural rubber with chlorine has been notably deficient when used in the form of films particularly because the material has had very little flexibility in thin films or coatings and has even become more brittle with age. It has been customary to incorporate plasticizers with the chlorinated rubber to improve its flexibility but such plasticizers as have been suggested have not provided flexibility over extended periods and furthermore have lead to considerably decreased chemical resistivity of the film.

It has been found in accordance with this invention that chlorinated rubber having inherently different flexibility characteristics from ordinary chlorinated rubber may be produced. Thus, it has been found that a chlorinated rubber having the property of high initial and permanent flexibility when in the form of an unplasticized film may be produced by a process involving two essential, mutually dependent stages. In the first stage natural rubber is digested with a dilute aqueous acidic solution containing from about 0.5 to about 10% by weight of an acid which is stable aqueous solutions at temperatures in the range of 150° to 235° C. The digestion is carried out by heating the rubber with the aqueous acidic solution at a temperature within the range of about 150° C. to about 235° C., and preferably about 165° C. to about 210° C., for a period of time from about one to about eight hours and is interrupted at a point at which the rubber after subsequent washing and drying will have a viscosity in a 1% carbon tetrachloride solution at 25° C. equivalent to no more than about 10% and preferably no more than about 5% of the viscosity of a 2-day old 1% solution of the original untreated rubber in the same solvent, as measured by the Hercules capillary tube method. The digested rubber so characterized will be very soft in comparison with the original rubber and therefore will be useless for applications in which the mechanical properties of rubber are of importance, as in submarine cable insulating compositions. In the second stage of the process the digested rubber, after being washed and dried, is dissolved in a chlorination solvent such as for example, carbon tetrachloride, tetrachloroethane, ethylene dichloride, chloroform, benzene, etc., and chlorinated by passing chlorine into the solution until the digested rubber has become chlorinated to the extent of about 62 to about 70 per cent by weight of chlorine. The chlorinated product of high initial and permanent flexibility is then recovered by any suitable means, such as by precipitation, solvent evaporation, etc.

The natural rubber which is digested in accordance with the invention will preferably be in a form which is easily penetrated by the aqueous acidic solution under the digestion conditions. Thus, slices of thin-sheet crepe rubber as it appears on the market in the form of bales is very satisfactory. Smoked sheet rubber which is available in densely packed bales is also satisfactory. Such smoked sheet rubber is preferably reduced to thin sheets prior to the digestion treatment. If desired, thick sheet crepe rubber may be employed. Natural or preserved latex, artificial dispersions of rubber or rubber in other forms such as cheap low grades of rubber, vulcanized rubber, etc., may also be used. The digestion treatment serves to eliminate objectionable impurities present in low grades of rubber and thus renders such low grade rubber useful in the process.

The dilute aqueous acidic solution utilized in the digestion step will contain an acid which is stable in aqueous solution at the temperature of digestion. The acid may be inorganic or organic and either monobasic or polybasic. Suitable acids are for example, phosphoric acid, sulfuric acid, hydrochloric acid, boric acid, acetic acid, maleic acid, propionic acid, malic acid, citric acid, tartaric acid, succinic acid, oxalic acid, as well as others. The amount of dilute aqueous acidic solution used in the digestion may be varied over wide ranges and will depend to some extent on the shape of the digestion vessel. It will usually be sufficient to completely cover the rubber.

The digestion of the rubber with the dilute aqueous acidic solution will be carried out in an autoclave or other suitable pressure device at the above defined temperatures and for a time such as described above. After completion of the digestion the rubber is washed with water to remove soluble digestion products and to free the rubber from the acid. The washing may be carried out by any suitable means, such as at moderate temperatures up to 100° C. on a mechanical rubber washer. The washed digested rubber is preferably dried in any suitable manner such as by rolling on hot surfaces, for example on the rolls of a mechanical rubber washer. The drying will be sufficient to remove substantially all the water. A surprising feature of the invention is the fact that only a very slight loss in weight of the rubber occurs in the complete digestion, washing and drying operation. The yield of dried digested rubber is generally at least 97% by weight based on the weight of natural rubber used. The digestion serves to substantially remove proteinaceous impurities but does not remove the acetone extractable materials from the natural rubber.

The time for carrying out the digestion to provide the digested rubber of the above viscosity characteristics will depend on the temperature of digestion, the particular acid employed and the concentration of the acid. These three variables are interrelated and the influence of each must be considered to secure a completely successful digestion. In any event, the digestion is carried out in the above defined temperature range and with the above concentrations of acid for a period of time sufficient to reduce the viscosity of the rubber to a point at which the rubber after washing and drying will have a viscosity in a 1% carbon tetrachloride solution at 25° C. equivalent to no more than about 10% and preferably no more than about 5% of the viscosity of a 2-day old 1% solution of the original untreated rubber in the same solvent, as measured by the Hercules capillary tube method. At the higher temperatures of digestion in the above range a lower concentration of acid or a shorter time of digestion, or both, may be employed. With any given temperature of digestion above 150° C. the time required will generally decrease with the increase in acid concentration.

The digestion treatment utilized produces a profound change in the rubber. While it serves to substantially remove the protein content, it does not appear that the decreased nitrogen content of the rubber is correlated in any way with the high initial and permanent flexibility characteristics of the chlorinated product. It appears that the digestion produces a breakdown in the rubber molecule itself into polymeric units of smaller size and that such a chemical change in the rubber hydrocarbon itself is responsible for the different characteristics of the rubber as compared with ordinary natural rubber when transformed into the chlorinated derivative. Besides being characterized by the above-defined viscosity, the digested rubber will be characterized by containing substantially all the acetone extractable material originally present in the natural rubber.

The chlorinated digested rubber obtained will be particularly characterized by its high initial flexibility when used in the form of an unplasticized film and by the permanence of such flexibility on aging. An actual increase in the high flexibility usually occurs on aging of the chlorinated product. Chlorinated rubber obtained from untreated crepe rubber has very little initial flexibility in the form of an unplasticized film and becomes much more brittle with age. The chlorinated digested rubber produced by the process of the invention will be further characterized by a freedom from haze in solution, thus providing solutions of much lower opacity than are obtained with ordinary chlorinated rubber. The chlorinated product will also be more stable chemically than ordinary chlorinated rubber obtained from untreated crepe rubber. The high yield of digested rubber obtained in the digestion process, namely above about 97% based on the weight of rubber treated is carried over into the chlorination step of the invention and thereby provides the improved chlorinated product in a correspondingly high yield.

The following specific examples will serve to illustrate the various embodiments of the invention:

*Example 1*

Thin-sheet crepe rubber cut into slices was heated in an autoclave with a sufficient amount of a 4% aqueous solution of phosphoric acid to cover the rubber at a temperature of 165° C. for a period of eight hours. After allowing the autoclave to cool it was opened and the digested rubber washed with water at a temperature of about 95° C. in a mechanical rubber washer and dried in the same equipment by heating the rolls of the rubber washer and the vessel itself with steam. The dried digested rubber had a viscosity in a 1% carbon tetrachloride solution at 25° C. of 9 seconds by the Hercules capillary tube method as compared with 1330 seconds for a 2-day old 1% solution of the untreated rubber. The yield of digested rubber was 97.5% based on the original rubber used. The dried digested rubber was then dissolved in carbon tetrachloride to give a 5% by weight solution and chlorinated by passing chlorine into the solution to give a chlorinated digested rubber containing 68.8% of chlorine. The chlorinated rubber was then recovered by precipitation in water and freed from water by centrifuging and drying at a temperature of about 65° C. The chlorinated digested rubber had an initial flexibility value in an unplasticized film of two mils thickness represented by 48 double folds on a Schopper film testing machine. This initial flexibility actually increased during aging and after 42 days the flexibility had increased to 115 double folds.

*Example 2*

The thin-sheet crepe rubber used in Example 1 in small slices was digested as in Example 1 but with use of a 4% aqueous solution of phosphoric acid and at a temperature of 198° C. for two hours. The digested rubber obtained had a viscosity in a 1% carbon tetrachloride solution at 25° C. of 13 seconds by the Hercules capillary tube method and was obtained in a yield of 97.5%. The digested rubber was chlorinated in carbon tetrachloride solution as in Example 1 to give a chlorinated digested rubber containing 67.7% of combined chloride. The chlorinated product showed an initial Schopper value in an unplasticized film of two mils thickness of 58 double folds. After aging of the film for 44 days the flexibility had increased to 69 double folds.

*Example 3*

The process of Example 2 was duplicated except with use of a 2% aqueous solution of phosphoric acid and with use of a digestion time of four hours. The digested rubber obtained had a viscosity in a 1% carbon tetrachloride solution at 25° C. of 21 seconds by the Hercules capillary tube method. The yield of digested rubber was 97% based on the weight of rubber treated. The chlorinated rubber obtained had a chlorine content of 68.1% and an initial film flexibility in an unplasticized film of two mils thickness as represented by 42 Schopper double folds. This flexibility increased to 55 double folds after aging for 18 days.

*Example 4*

The procedure of Example 2 was duplicated except with use of a digestion temperature of 180°

C. and a digestion time of four hours. The digested rubber obtained had a viscosity in a 1% carbon tetrachloride solution at 25° C. of 11 seconds by the Hercules capillary tube method and was obtained in a yield of 98.8% by weight based on the rubber. The chlorinated product had a chlorine content of 68.9% and an initial film flexibility in an unplasticized film of two mils thickness represented by 55 Schopper double folds. After aging of the film for 42 days this flexibility had increased to 62 double folds.

Example 5

Thin-sheet crepe rubber as used in Example 1 cut into small slices was digested in an autoclave with a sufficient amount of a 4% aqueous acetic acid solution to cover the rubber at a temperature of 198° C. for four hours. The digested rubber was washed and dried as in Example 1. It had a viscosity in a 1% carbon tetrachloride solution at 25° C. of 4 seconds by the Hercules capillary tube method. The yield of digested rubber was 97% based on the weight of the rubber. The digested rubber was chlorinated as in Example 1 to give a chlorinated rubber containing 67.3% by weight of combined chlorine. The chlorinated product had an initial flexibility in an unplasticized film of two mils thickness represented by 51 Schopper double folds. This flexibility was retained on aging.

Example 6

The procedure of Example 5 was duplicated except that an 8% aqueous acetic acid solution was employed for the digestion. The dried digested rubber obtained had a viscosity at 25° C. in a 1% carbon tetrachloride solution of 14 seconds by the Hercules capillary tube method and was obtained in a yield of 97.5%. The chlorinated product contained 69.4% of chlorine and had an initial film flexibility in an unplasticized film of two mils thickness represented by 77 Schopper double folds, and retained the high flexibility on aging.

Example 7

The procedure of Example 5 was duplicated except with use of a 4% aqueous sulfuric acid solution. The digested rubber obtained had a viscosity in a 1% carbon tetrachloride solution at 25° C. of 45 seconds by the Hercules capillary tube method and was obtained in a yield of 98.7% by weight based on the weight of rubber. The chlorinated rubber obtained from this digested rubber had a chlorine content of 67.2% by weight and an initial film flexibility in an unplasticized film of two mils thickness as represented by 61 Schopper double folds, this high flexibility being retained on aging.

Example 8

The procedure of Example 5 was duplicated except with use of an aqueous 4% solution of maleic acid. The digested rubber obtained had a viscosity in a 1% carbon tetrachloride solution at 25° C. of 24 seconds by the Hercules capillary tube method. The digestion yield was 100% based on the weight of rubber treated. Chlorination of this digested rubber gave a chlorinated product having 68.0% by weight of combined chlorine and an initial film flexibility in an unplasticized film of two mils thickness as represented by 62 Schopper double folds. The high flexibility was retained on aging.

Example 9

Thin-sheet crepe rubber as used in Example 1 in the form of thin slices was covered with a 2% aqueous solution of phosphoric acid in an autoclave and digested at a temperature of 235° C. for 1 hour. The digested rubber was then washed and dried as in Example 1. It had a viscosity of 14 seconds in a 1% carbon tetrachloride solution by the Hercules capillary tube method and was obtained in a yield of 97.5%. The digested rubber was chlorinated as in Example 1 to give a chlorinated product containing 68.5% by weight of combined chlorine. The chlorinated rubber obtained had an initial flexibility in the form of an unplasticized film of two mils thickness as represented by 60 Schopper double folds. The high flexibility was retained on aging.

It will be apparent from the above description and examples that the described process provides a chlorinated rubber of highly desirable characteristics. The high initial and permanent flexibility characteristics of the chlorinated product are not to be found in ordinary chlorinated rubber and are of such considerable significance as to render the chlorinated rubber adapted to many commercial applications for which the ordinary chlorinated rubbers have been unsuited due to their low film flexibilities. It will also be much more satisfactory in varnishes, lacquers, paints, etc. Furthermore, by the process of the invention such an improved chlorinated rubber is obtained with very little sacrifice in yield and is highly economical for commercial exploitation.

It will be understood that the details and examples hereinbefore set forth are illustrative only and that the invention as broadly described and claimed is in no way limited thereby.

What I claim and desire to protect by Letters Patent is:

1. The method of producing chlorinated rubber characterized by containing about 62 to about 70 per cent chlorine and by high initial and permanent flexibility when in the form of an unplasticized film which comprises the steps of digesting rubber with a dilute aqueous solution of an acid at a temperature within the range of about 150° C. to about 235° C. until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

2. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of an acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

3. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of phosphoric acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

4. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of acetic acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

5. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of sulfuric acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

FREDERIC JAMES BOUCHARD.

Certificate of Correction

Patent No. 2,401,133.　　　　　　　　　　　　　　　　　　　　May 28, 1946.

FREDERIC JAMES BOUCHARD

It is hereby certified that error appears in the printed specification of the above numbered patent requiring correction as follows: Page 1, first column, line 33, before the word "aqueous" insert *in*; and that the said Letters Patent should be read with this correction therein that the same may conform to the record of the case in the Patent Office.

Signed and sealed this 6th day of August, A. D. 1946.

[SEAL]

LESLIE FRAZER,
*First Assistant Commissioner of Patents.* dissolving the digested rubber in a suitable solvent and chlorinating to give a chlorinated product containing from about 62 to about 70 per cent chlorine.

3. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of phosphoric acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

4. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of acetic acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

5. The method of producing chlorinated rubber characterized by containing about 62 to about 70 per cent chlorine and by high initial and permanent flexibility when in the form of an unplasticized film which comprises the steps of digesting rubber with a dilute aqueous solution containing from about 0.5% to about 10% by weight of sulfuric acid at a temperature within the range of about 150° C. to about 235° C. for a period of time from about one hour to about 8 hours until a digested rubber is obtained which after washing and drying will have a viscosity in a 1% carbon tetrachloride solution at 25° C. equivalent to no more than about 10% of the viscosity of a 2-day old solution of the original untreated rubber in the same solvent, washing the digested rubber, drying the digested rubber, dissolving the digested rubber in a suitable solvent and chlorinating to give a chlorinated product containing from about 62 to about 70 per cent chlorine.

FREDERIC JAMES BOUCHARD.

---

Certificate of Correction

Patent No. 2,401,133.                                  May 28, 1946.

FREDERIC JAMES BOUCHARD

It is hereby certified that error appears in the printed specification of the above numbered patent requiring correction as follows: Page 1, first column, line 33, before the word "aqueous" insert *in*; and that the said Letters Patent should be read with this correction therein that the same may conform to the record of the case in the Patent Office.

Signed and sealed this 6th day of August, A. D. 1946.

[SEAL]

LESLIE FRAZER,
*First Assistant Commissioner of Patents.*